(12) United States Patent
Takahashi (10) Patent No.: US 10,734,030 B2
(45) Date of Patent: Aug. 4, 2020

(54) RECORDED DATA PROCESSING METHOD, TERMINAL DEVICE, AND EDITING DEVICE

(71) Applicant: Yamaha Corporation, Hamamatsu, Shizuoka (JP)

(72) Inventor: Yu Takahashi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 60 days.

(21) Appl. No.: 16/046,536

(22) Filed: Jul. 26, 2018

(65) Prior Publication Data

US 2018/0336930 A1 Nov. 22, 2018

Related U.S. Application Data

(63) Continuation of application No. PCT/JP2017/001508, filed on Jan. 18, 2017.

(30) Foreign Application Priority Data

Jan. 27, 2016 (JP) .................................. 2016-013278

(51) Int. Cl.
*G11B 27/32* (2006.01)
*H04N 5/91* (2006.01)
(Continued)

(52) U.S. Cl.
CPC ............ *G11B 27/32* (2013.01); *G11B 27/031* (2013.01); *G11B 27/10* (2013.01); *G11B 27/34* (2013.01); *H04N 5/91* (2013.01); *H04N 21/21805* (2013.01); *H04N 21/242* (2013.01); *H04N 21/2665* (2013.01); *H04N 21/274* (2013.01);
(Continued)

(58) Field of Classification Search
CPC ... G11B 27/32; H04N 21/2665; H04N 21/242
See application file for complete search history.

(56) References Cited

U.S. PATENT DOCUMENTS

| 9,548,053 | B1 * | 1/2017 | Basye .................. G06F 16/683 |
| 2013/0121662 | A1 * | 5/2013 | Moorer ............. H04N 21/4223 386/240 |
| 2015/0104043 | A1 | 4/2015 | Takahashi et al. |

FOREIGN PATENT DOCUMENTS

| JP | 2014-150383 A | 8/2014 |
| JP | 2015-100103 A | 5/2015 |

OTHER PUBLICATIONS

International Search Report in PCT/JP2017/001508 dated Feb. 21, 2017.

* cited by examiner

*Primary Examiner* — Girumsew Wendmagegn
(74) *Attorney, Agent, or Firm* — Global IP Counselors, LLP (57) ABSTRACT

A recorded data processing method is performed that includes generating synchronization information indicating a relationship of recorded data with respect to reference data on a time axis by comparing the recorded data including video recorded by a recording device and the reference data that act as a reference for the recorded data on a time axis and that represent audio or video; and transmitting from a terminal source material data that include video that corresponds to the recorded data and the synchronization information that was generated to an editing device that generates content including a plurality of mutually synchronized videos from a plurality of the source material data.

5 Claims, 4 Drawing Sheets

(51) Int. Cl.
*H04N 21/2665* (2011.01)
*H04N 21/218* (2011.01)
*H04N 21/274* (2011.01)
*G11B 27/10* (2006.01)
*H04N 21/8547* (2011.01)
*H04N 21/242* (2011.01)
*G11B 27/031* (2006.01)
*G11B 27/34* (2006.01)
*G10L 25/57* (2013.01)

(52) U.S. Cl.
CPC ......... *H04N 21/8547* (2013.01); *G10L 25/57* (2013.01)

RECORDED DATA PROCESSING METHOD, TERMINAL DEVICE, AND EDITING DEVICE

CROSS-REFERENCE TO RELATED APPLICATIONS

This application is a continuation-in-part application of International Application No. PCT/JP2017/001508, filed Jan. 18, 2017, which claims priority to Japanese Patent Application No. 2016-013278 filed in Japan on Jan. 27, 2016. The entire disclosures of International Application No. PCT/JP2017/001508 and Japanese Patent Application No. 2016-013278 are hereby incorporated herein by reference.

BACKGROUND

Technological Field

The present invention relates to technology for processing video.

Background Technology

Various technologies have been proposed for processing a plurality of recorded data, each including audio and video, and that record a common recording subject have been proposed in the prior art. For example. Japanese Laid-open Patent Application No. 2015-100103 (hereinafter referred to as Patent Document 1) discloses technology for acquiring respective audio data recording a common subject from a plurality of terminal devices and mutually synchronizing the plurality of audio data with each other to thereby generate new audio data.

SUMMARY

In the technology disclosed in Patent Document 1, a process for analyzing the temporal relationship between audio data is earned out by a server, in order to synchronize a plurality of items of audio data acquired from a plurality of respective terminal devices. Consequently, there is the problem that, when the total amount of audio data is extremely large, the processing load on the server becomes high. While a process for analyzing the temporal relationship between a plurality of items of audio data is mentioned here, the same problem occurs when processing the temporal relationship between a plurality of recorded data that include video.

In accordance with one aspect of this disclosure, a recorded data processing method is performed that comprises generating synchronization information indicating a relationship of recorded data with respect to reference data on a time axis by comparing the recorded data including video recorded by a recording device and the reference data that act as a reference for the recorded data on a time axis and that represent audio or video; and transmitting from a terminal source material data that include video that corresponds to the recorded data and the synchronization information that was generated to an editing device that generates content including a plurality of mutually synchronized videos from a plurality of the source material data.

In accordance with an aspect of this disclosure, a terminal device is provided that basically comprises an electronic controller and a communication device. The electronic controller has an information generation unit configured to generate synchronization information indicating a relationship of recorded data with respect to reference data on a time axis by comparing the recorded data including video recorded by a recording device and the reference data that act as a reference for the recorded data on the time axis and that represent audio or video. The communication device is configured to transmits source material data that include video that corresponds to the recorded data and the synchronization information that was generated to an editing device that generates content including a plurality of mutually synchronized videos from a plurality of the source material data In accordance with an aspect of this disclosure, an editing device is provided that basically comprises a communication device and an electronic controller. The communication device respectively receives synchronization information that represents the relationship of recorded data with respect to reference data from a plurality of terminal devices in which the reference data act as a reference for the recorded data including video recorded by a recording device on a time axis and represents audio or video on a time axis, and receives source material data, which include video that corresponds to the recorded data. The electronic controller has a content generation unit that generates content including a plurality of mutually synchronized videos from a plurality of the source material data and a plurality of the synchronization information.

DETAILED DESCRIPTION OF THE EMBODIMENTS

Selected embodiments will now be explained with reference to the drawings. It will be apparent to those skilled in the music or sound field from this disclosure that the following descriptions of the embodiments are provided for illustration only and not for the purpose of limiting the invention as defined by the appended claims and their equivalents.

First Embodiment

Figure 1:
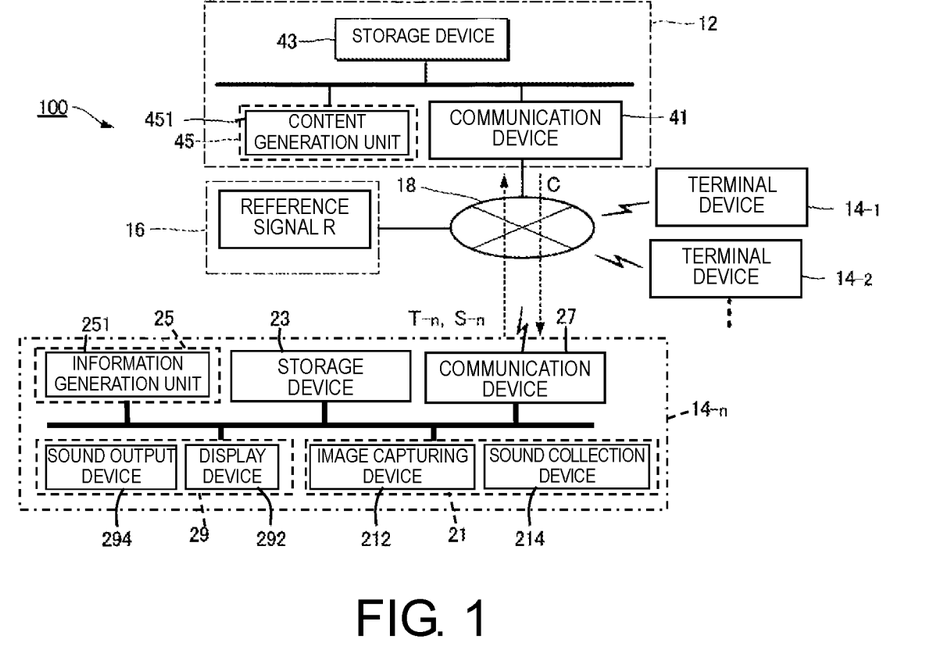
FIG. 1 is a block diagram of a recorded data processing system according to a first embodiment.

FIG. 1 is a block diagram of a recorded data processing system 100 according to a first embodiment. The recorded data processing system 100 is a computer system that is utilized when various events, such as a dance performance, are recorded by a large audience. The recorded data processing system 100 comprises an editing device 12, a plurality (N) of terminal devices 14-1 to 14-N, and a distribution device 16, as shown in FIG. 1. The editing device 12 is realized by, for example, a server device such as a web server. In addition, the editing device 12 can be realized as a single device, or be realized by a plurality of devices, each of which is configured separately. Each of the n terminal devices 14-1 to 14-N is a communication terminal that communicates with the editing device 12 via a communication network 18, such as a mobile communication network or the Internet. A terminal device 14-$n$ (n=1 to N) is a portable communication terminal such as a mobile phone, a smartphone, a tablet terminal, or a personal computer. In general, one item of content C is generated by data (hereinafter referred to as "recorded data") D-n, which include video V-n and audio A-n, recorded by the terminal device 14-n, being transmitted from each terminal device 14-n to the editing device 12, and the editing device 12 editing N items of recorded data D-1 to D-N, which are respectively received from each terminal device 14-n.

Distribution Device 16

A distribution device 16 stores data (hereinafter referred to a "reference data") R, which act as reference for each item of recorded data D-n on a time axis and distributes the data to N terminal devices 14-1-14-N via the communication network 18. The reference data R in the first embodiment are audio signals (reference signals) that represent audio. In the first embodiment, a case is assumed in which the sound of a dance music performance is reproduced from sound output devices (such as speakers) that are installed in a dance venue. The sound of the music of the performance can be, for example, music that has been prerecorded, and that is used as background music when the dance is being performed. The reference data R of the first embodiment are audio signals that represent the sound of the performance that is reproduced at the event venue. When each of N terminal devices 14-1 to 14-N records a dance performance at a dance venue, the N items of audio A-1 to A-N respectively included in N items of recorded data D-1 to D-N commonly contain the same audio as in the reference data R.

The method of distributing the reference data R from the distribution device 16 to each terminal device 14-n is arbitrary; for example, a method for distributing reference data R for each event, or a method for distributing a QR code (registered trademark) to the user of the terminal device 14-n and inducing the user to download the reference data R, can be employed. In addition, the distribution device 16 can broadcast the reference data R to each terminal device 14-n via a wireless LAN at the event venue.

Terminal Device 14-n

As shown in FIG. 1, each of the terminal devices 14-n comprises a recording device 21, a storage device 23, an electronic controller 25, a communication device 27, and a reproduction device 29.

The recorded device 21 of the first embodiment is a device that generates recorded data D-n, and comprises an image capturing device 212 for capturing video V-n and a sound collection device 214 for collecting audio A-n. The image capturing device 212 can be, for example, a digital camera or a digital camcorder, and the sound collection device 214 can be, for example, a microphone. A configuration in which the image capturing device 212 and the sound collection device 214 are installed in the terminal device 14-n is illustrated in FIG. 1. However, it is also possible to connect the image capturing device 212 and the sound collection device 214 that are separate from the terminal device 14-n to the terminal device 14-n, wirelessly or in a wired manner. The capture of the video V-n by using the image capturing device 212 and the audio A-n by using the sound collection device 214 are executed in parallel with each other, thereby generating recorded data D-n including the video V-n and the audio A-n.

The users of terminal devices 14-n utilize the recording devices 21 of their own terminal devices 14-n and record, in parallel, video V-n and audio A-n of a common recording subject (for example, a dance event) from, for example, different locations. That is, the terminal devices 14-n are arranged in different positions of a common acoustic space of an event venue, such as a dance venue. For example, each of the recording devices 21 of the N terminal devices 14-1 to 14-N records, for example, a dance performance from a different angle in parallel, and respectively generates recorded data D-n. As described above, because the same acoustic components as the reference data R are reproduced from the sound output devices in the event venue, the N items of audio A-1 to A-N, which are respectively recorded by N terminal devices 14-1 to 14-N, commonly contain the same acoustic components as the reference data R (however, the acoustic characteristics, such as volume, may differ).

The recording device 21 starts to record the video V-n and the audio A-n triggered by an instruction from the user. Therefore, the timing at which the recording by the recording device 21 starts may differ for each terminal device 14-n. That is, the start points of the recording of the video V-n and audio A-n may differ between the N items of recorded data D-1 to D-N. Therefore, if the N items of recorded data D-1 to D-N are simply synthesized, content C in which the positions of the video V-n and audio A-n on a time axis are shifted between the N items of recorded data D-1 to D-N will be generated.

The storage device 23 is a known storage medium such as a magnetic storage medium or a semiconductor storage medium, which stores a program that is executed by the electronic controller 25, and various data that are used by the electronic controller 25. For example, reference data D-n including video V-n and audio A-n that are recorded by the recording device 21 and reference data R, which act as a reference for the recorded data D-n on a time axis, are stored in the storage device 23. Although reference data R that are distributed from the distribution device 16 are stored in the storage device 23, it is also possible to store the reference data R in the storage device 23 in advance.

The term "electronic controller" as used herein refers to hardware that executes software programs. The electronic controller 25 includes processing devices such as a CPU (Central Processing Unit) having at least one processor that controls the overall operation of the terminal device 14-n. Specifically, as shown in FIG. 1, the electronic-controller 25 functions as an information generation unit 251 that generates synchronization information S-n by executing a program that is stored in the storage device 23. A configuration in which part of the functions of the electronic controller 25 are realized by a dedicated electronic circuit, or a configuration in which the functions of the electronic controller 45 are distributed among a plurality of devices, can also be employed.

Figure 2:
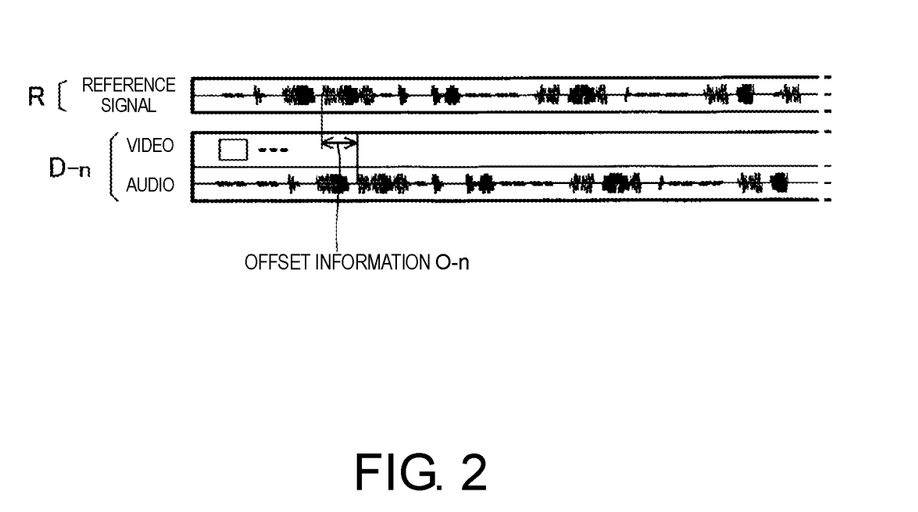
FIG. 2 is an explanatory view of offset information that is included in synchronization information.

The information generation unit 251 generates information (hereinafter referred to as "synchronization information") S-n, which represents the relationship of the recorded data D-n with respect to the reference data R on a time axis by comparing the recorded data D-n that are recorded by the recording device 21 and the reference data R, which act as a reference for the recorded data D-n on a time axis. As described above, the audio A-n included in the recorded data D-n contains the same acoustic components as the reference data R. Therefore, by comparing the audio A-n included in the recorded data D-n and audio that is represented by the reference data R, which act as a reference for the recorded data D-n on a time axis, synchronization information S-n that contains offset information O-n, which represents the position of the recorded data D-n on a time axis with respect to the reference data R, is generated. As shown in FIG. 2, offset information O-n represents the time difference between a specific point in time of the reference data R on a time axis and the location of the recorded data D-n that corresponds to said point in time (location where the common audio exists), when the start points of the reference data R and the recorded data D-n coincide on a time axis. Therefore, when content C in the editing device 12 is generated, it is possible to mutually synchronize N items of recorded data D-1 to D-N by adjusting the position of the recorded data D-n on the time axis (specifically, the point in time of the beginning of the source material data T-n) by the time represented by the offset information O-n. Mutually synchronized means a state in which the time axes of the video V-n and audio A-n included in each of the recorded data D-n coincide across the N items of recorded data D-1 to D-N. As can be understood from the foregoing description, offset information O-n can also be expressed as information that represents the time difference between the start points of the reference data R and the recorded data D-n when the two are mutually synchronized.

The communication device 27 of FIG. 1 is a communication device that communicates with the editing device 12 via the communication network 18. Specifically, the communication device 27 transmits the recorded data D-n that are generated by the recording device 21 as data (hereinafter referred to as "source material data") T-n, which become the raw material of the content C, to the editing device 12, and also transmits synchronization information S-n that includes the offset information O-n generated by the information generation unit 251 to the editing device 12. The term "communication device" as used herein includes a receiver, a transmitter, a transceiver and a transmitter-receiver, capable of transmitting and/or receiving communication signals. In this embodiment, the communication device 27 transmits communication signals, and thus, the communication device 27 can be a transmitter, a transceiver, or a transmitter-receiver. The reproduction device 29 reproduces the content C generated by the editing device 12 and includes a display device 292 that displays images controlled by the electronic controller 25, and a sound output device 294 that outputs audio controlled by the electronic controller 25. Specifically, the video of the content C is displayed on the display device 292, and the audio of the content C is output front the sound output device 294.

Editing Device 12

As shown in FIG. 1, the editing device 12 comprises a communication device 41 (one example of a communication unit), a storage device 43, and an electronic controller 45. The communication device 41 communicates with each of N terminal devices 14-1 to 14-N via the communication network 18. Specifically, the communication device 41 receives synchronization information S-n and source material data T-n that are transmitted from each terminal device 14-n. Each item of synchronization information S-n of the first embodiment includes offset information O-n, as described above. In this embodiment, the communication device 41 receives and transmits communication signals, and thus, the communication device 27 can be a transceiver or a transmitter-receiver.

The storage device 43 is a known storage medium such as a magnetic storage medium or a semiconductor storage medium and stores a program that is executed by the electronic controller 45 and various data that are used by the electronic controller 45. For example, N items of synchronization information S-1 to S-N and N items of source material data T-1 to T-N that are respectively received from the N terminal devices 14-1 to 14-N by the communication device 41 are stored in the storage device 43.

The electronic controller 45 includes processing devices such as a CPU (Central Processing Unit) having at least one processor that controls the overall operation of the editing device 12. Specifically, as shown in FIG. 1, the electronic controller functions as a content generation unit 451 for generating the content C by executing a program that is stored in the storage device 43. The content generation unit 451 generates content C, which includes mutually synchronized N videos V-1 to V-N and audio A-1 to A-N from the N items of source material data T-1 to T-N that are received by the communication device 41. A configuration in which a part of the Junctions of the electronic controller 45 is realized by a dedicated electronic circuit, or a configuration in which the functions of the electronic controller 45 are distributed among a plurality of devices may also be employed.

Figure 3:
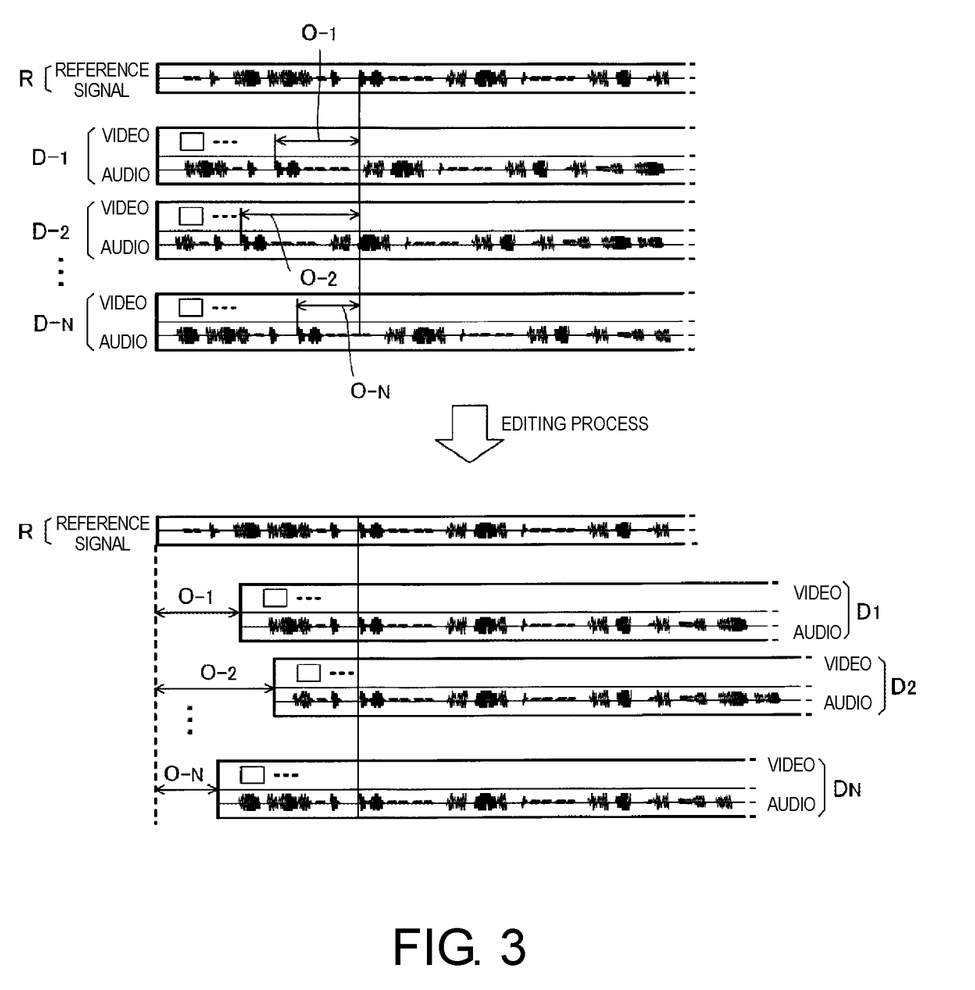
FIG. 3 is an explanatory view of an editing process that is carried out by the content generation unit.

The content generation unit 451 generates content C, which includes N videos V-1 to V-N and N items of audio A-1 to A-N, mutually synchronized by means of a process executed on the N items of source material data T-1 to T-N received by the communication device 41 (hereinafter referred to as "editing process"). FIG. 3 is an explanatory view of an editing process that is carried out by the content generation unit 451. Specifically, the editing process includes a process for changing the position of the source material data T-n on the time axis by the time designated by the offset information O-n. Because each item of offset information O-n is the time difference of the audio A-n with respect to the common reference data R, the positions of the N items of source material data T-1 to T-N on the time axis coincide (that is, are synchronized) by moving each of the source material data T-n forward or backward (shifting forward or backward) on the time axis by the time of the offset information O-n. Therefore, by utilizing the offset information O-n in the editing process, it is possible to align the positions on the time axis of the N items of video V-1 to V-N and N items of audio A-1 to A-N included in the content C, as shown in FIG. 3. That is, it becomes possible to generate content C in which the differences in the start timings of the recordings by the recording devices 21 are reduced.

Figure 4:
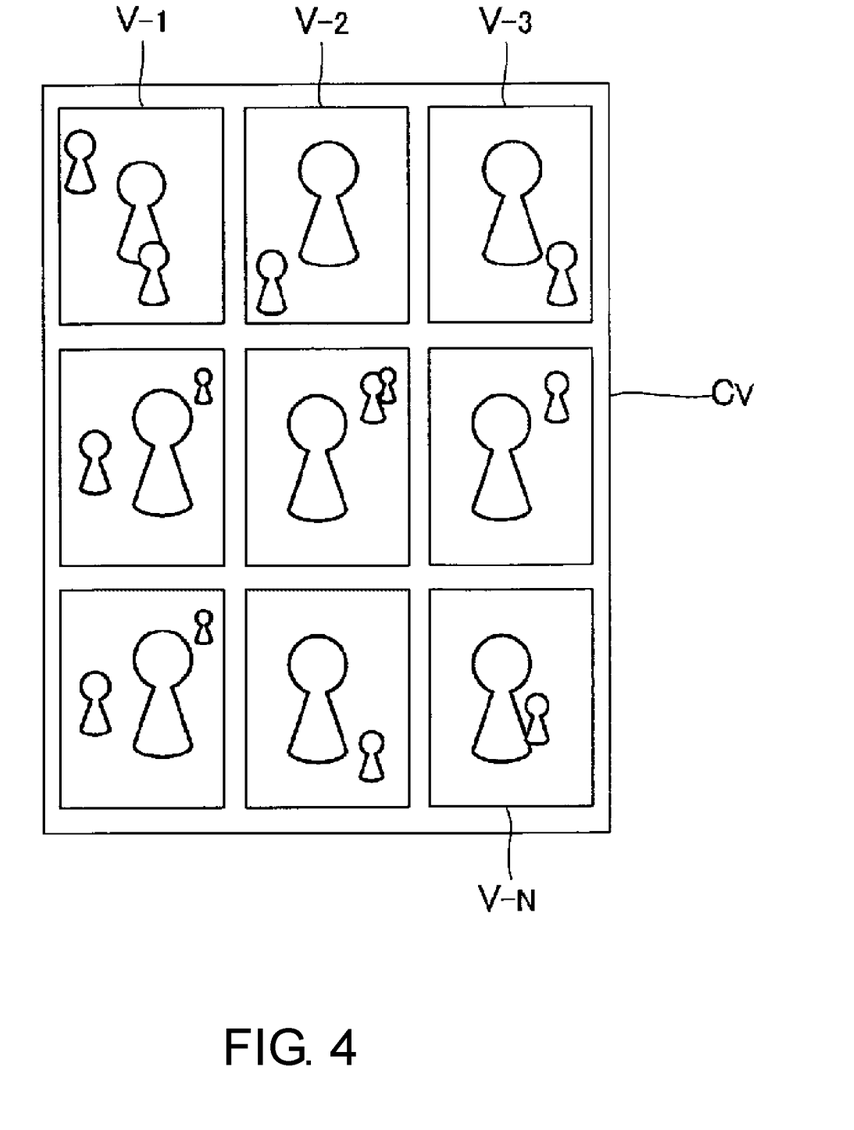
FIG. 4 is a schematic view of video that is included in the content.

The editing process of the first embodiment includes a synthesis process executed on the N items of audio A-1 to A-N, such as mixing or mastering. The content C generated by the content generation unit 451 includes an audio CA obtained by synthesizing the N items of audio A-1 to A-N and a video CV obtained by synthesizing the N items of video V-1 to V-N after the above-described editing process is performed. As shown in FIG. 4, the video CV is video with which it is possible to simultaneously display, for example, N items of video V-1 to V-N on the display device 292. The content of content C is arbitrary. For example, it is also possible to include, in content C, video CV obtained by mutually linking portions of each video V-n of N items of source material data T-1 to T-N on a time axis, or audio CA obtained by mutually linking portions of each audio A-n of N items of source material data T-1 to T-N on a time axis. In the foregoing description, audio CA is generated by synthesizing N items of audio A-1 to A-N respectively included in N items of source material data T-1 to T-N; however, it is also possible to utilize as the audio CA of the content C, audio A-n that is included in any one of the N items of source material data T-1 to T-N.

Content C generated by the content generation unit 451 is transmitted from the communication device 41 to the terminal device 14-*n* in accordance with a request from the terminal device 14-*n*. The video CV included in content C is reproduced on the display device 292, and the audio CA included in content C is reproduced on the sound output device 294.

Figure 5:
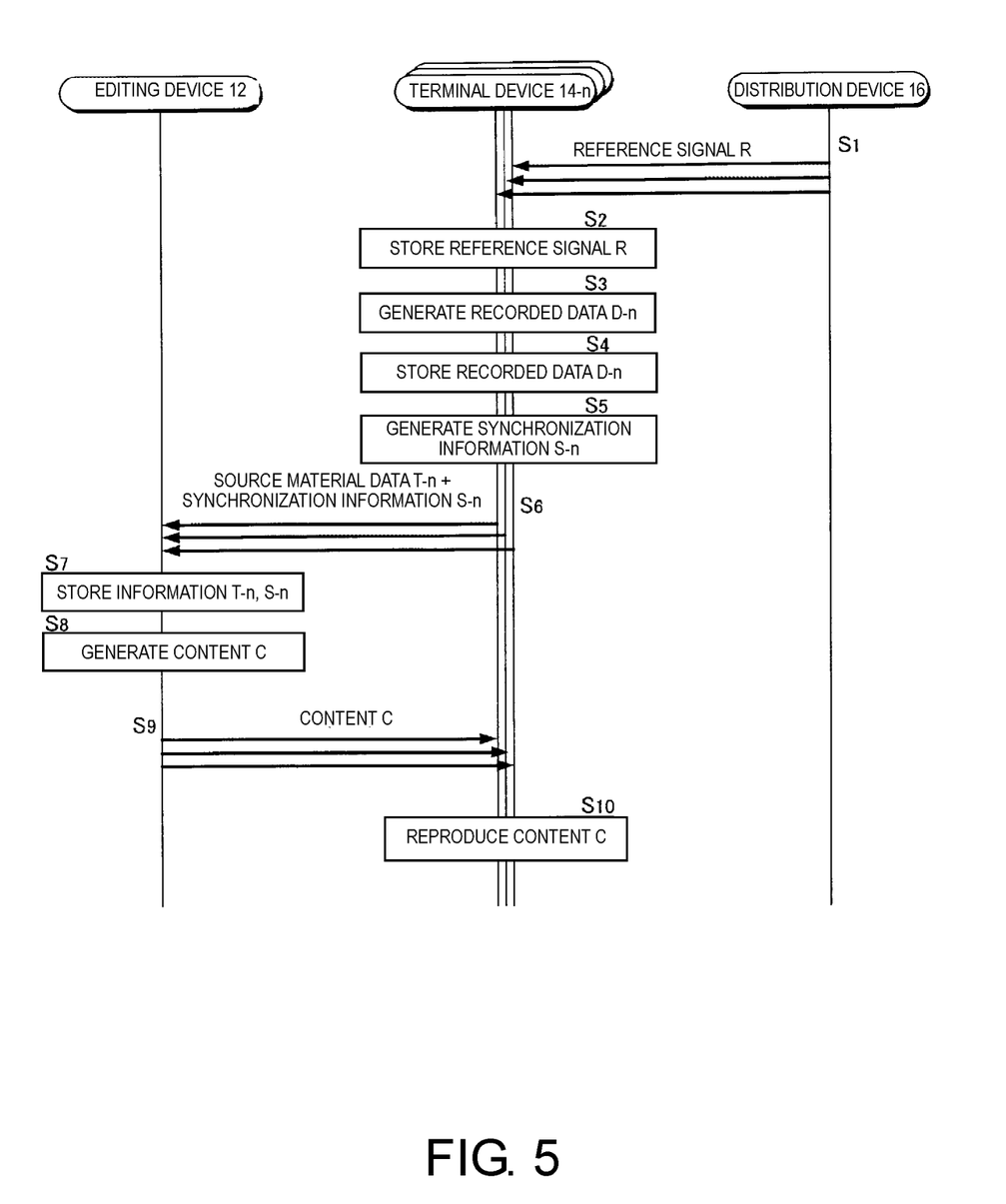
FIG. 5 is a flowchart of the processing of the entire recorded data processing system.

FIG. 5 is a flowchart of the processing of the entire recorded data processing system 100. A plurality of users who record the state of the dance performance by means of the terminal devices 14-*n* are present at the dance venue. The processing of FIG. 5 is started, triggered by an instruction for activating a program (application program) stored in the storage device 23 from a user.

First, before the dance performance at the event is started, the distribution device 16 transmits reference data R, which are audio signals that represent the audio, to N terminal devices 14-1 to 14-N via the communication network 18 (S1). The electronic controller 25 of each terminal device 14-*n* stores the reference data R received by the communication device 27 from the distribution device 16 in the storage device 23 (S2). When the dance performance is started, the user issues an instruction to record the recorded data D-n to the recording device 21 at each arbitrary timing. When a recording instruction is issued, the recording device 21 generates recorded data D-n that include video V-n that captures the state of the dance event and audio A-n that collects the reproduced sound at the event venue (S3). In parallel with the generation of the recorded data D-n by means of the recording device 21, the electronic controller 25 of each terminal device 14-*n* stores the recorded data D-n recorded by using the recording device 21 in the storage device 23 (S4). When the dance performance (recording of the recorded data D-n) ends, the electronic controller 25 (information generation unit 251) of each terminal device 14-*n* compares the audio A-n included in the recorded data D-n with the audio represented by the reference data R, to thereby generate synchronization information S-n that includes offset information O-n, which represents the offset between the positions on the time axis of the audio represented by the reference data R and of the audio A-n included in the recorded data D-n (S5).

The communication device 27 of each terminal device 14-*n* transmits source material data T-n including the audio A-n and the video V-n of the recorded data D-n and synchronization information S-n including the offset information O-n (S6). For example, the source material data T-n and the synchronization information S-n are transmitted from the communication device 27 to the editing device 12, triggered by an instruction to end the recording operation from the user. However, a trigger for transmitting the source material data T-n and the synchronization information S-n is not limited to an instruction from the user. For example, it is also possible for each terminal device 14-*n* to end the recording operation and transmit the source material data T-n and the synchronization information S-n to the editing device 12 at the point in time at which a predetermined effective period has elapsed from the reception of the reference data R, or at the point in time at which a predetermined time (for example, the end time of the event) arrives. It is also possible to trigger the transmission of the source material data T-n and the synchronization information S-n by using the reception of an end instruction transmitted from the editing device 12 as a trigger.

The electronic controller 45 of the editing device 12 stores the source material data T-n and the synchronization information S-n transmitted from each terminal device 14-*n* in the storage device 43 (S7). The electronic controller 45 of the editing device 12 (content generation unit 451) generates the content C, which includes mutually synchronized N items of video V-1 to V-N and audio A-1 to A-N, by executing an editing process utilizing N items of synchronization information S-1 to S-N on the N items of source material data T-1 to T-N received by the communication device 41. The communication device 41 of the editing device 12 transmits the content C generated by the content generation unit 451 to each terminal device 14-*n* (S9). For example, the content C is transmitted from the communication device 41 to the editing device 14, triggered by a request for the content C from the user of each terminal device 14-*n* after the content C is generated. However, a trigger for transmitting the content C is not limited to a request from the terminal device 14-*n*. For example, it is also possible to automatically start the transmission of content C to each terminal device 14-*n* at the point in time in which the generation of content C is completed.

Each terminal device 14-*n* reproduces the content C received by the communication device 27 on the reproduction device 29 (display device 292 and sound output device 294) in accordance with an instruction from the user (S10). In addition, it is also possible to upload the content C generated by the content generation unit 451 to, for example, a video posting site, and to use any information terminal to reproduce the content.

As can be understood from the foregoing description, synchronization information S-n is generated by analyzing the temporal relationship between the reference data R and the recorded data D-n in the terminal device 14-*n*, which is the transmission source of the source material data T-n with respect to the editing device 12. Therefore, compared with a configuration in which the temporal relationship between each recorded data D-n is analyzed after aggregating N items of recorded data D-1 to D-N in the editing device 12 to mutually synchronize the video V-1 to V-N and audio A-1 to A-N, it becomes possible to reduce the processing load on the editing device 12 (and, by extension, the time necessary for generating the content C), even if, for example, the total amount of the recorded data D-n is extremely large. In other words, the time from the transmission of the source material data T-n and the synchronization information S-n from each terminal device 14-*n* to the editing device 12 until the reception of the content C can be reduced.

In addition, because synchronization information S-n that includes offset information O-n is generated, it is possible to align the positions on the time axis of the N items of video V-1 to V-N and N items of audio A-1 to A-N included in the content C, which is generated by using said offset information O-n. That is, it becomes possible to generate content C in which the differences in the start timings of the recordings by the recording devices 21 are reduced.

Second Embodiment

The second embodiment will now be described. In each of the embodiments illustrated below, elements that have the same actions or functions as in the first embodiment have been assigned the same reference symbols as those used to describe the first embodiment, and the detailed descriptions thereof have been appropriately omitted.

The information generation unit 251 of the first embodiment generates synchronization information S-n that includes offset information O-n. The information generation unit 251 of the second embodiment generates synchronization information S-n that includes offset information O-n and error information E-n. Error information E-n is information that represents the error in the sampling frequency between the audio A-n represented by the recorded data D-n and the audio represented by the reference data R. Even if the sampling frequency is set to be the same in the sound collection devices 214 of N terminal devices 14-1 to 14-N, because the clock frequencies of the clock generators, which define the timing of A/D conversion, do not completely coincide, minute errors occur in the sampling frequencies between each of the terminal devices 14-$n$. Therefore, even if the audio CA is generated by mutually synchronizing the audios A-1 to A-N collected by the sound collection devices 214 by using the offset information O-1 to O-N, a problem may occur in that the playback location of each audio A-n included in the audio CA could differ (specifically, time-shifted) when the audio CA is reproduced. The error information E-n of the second embodiment is information for reducing the differences in the sampling frequencies between each of the terminal devices 14-$n$.

Specifically, the information generation unit 251 of the second embodiment generates offset information O-n in the same manner as in the first embodiment, and also error information E-n, which represents the error in the sampling frequency between the audio A-n represented by the recorded data D-n and the audio represented by the reference data R, by comparing the audio A-n included in the recorded data D-n and audio that is represented by the reference data R, which act as a reference for the recorded data D-n on a time axis. Known technology may be arbitrarily employed to calculate the error information E-n. For example, the sampling frequency estimation device disclosed in Japanese Laid-Open Patent Application No. 2015-197941 can be suitable used.

The communication device 27 transmits the video V-n and audio A-n included in the recorded data D-n generated by the recording device 21 as source material data T-n, which become the raw material of the content C, to the editing device 12, and also transmits synchronization information S-n that includes the error information E-n and offset information O-n generated by the information generation unit 231 to the editing device 12.

The content generation unit 451 of the editing device 12 generates content C, which includes mutually synchronized N items of video V-1 to V-N and N items of audio A-1 to A-N, by means of an editing process on the N items of source material data T-1 to T-N received by the communication device 41. The content C includes an audio CA obtained by synthesizing the N items of audio A-1 to A-N and a video CV obtained by synthesizing the N items of video V-1 to V-N after the editing process, in the same manner as in the first embodiment. In the editing process of the second embodiment, specifically, the positions of the source material data T-n on the time axis are changed by the time designated by the offset information O-n, in the same manner as in the first embodiment, and the source material data T-n is expanded or contracted (elongated or compressed) on the time axis commensurate with the size of the error in the sampling frequency designated by the error information E-n. Known technology may be arbitrarily employed to expand or contract source material data T-n. Each item of error information E-n is the error in the sampling frequency of the audio A-n with respect to the sampling frequency of the audio that represents the common reference data R. Therefore, it is possible to substantially match the sampling frequencies from each audio A-N, by expanding or contracting the audio A-n included in each source material data T-n on the time axis, by an amount of time in accordance with the error information E-n. That is, when the audio CA included in the content C is reproduced, it is possible to mutually match the playback location of each audio A-n included in the audio CA.

The same effects as those of the first embodiment are realized in the second embodiment. In addition, particularly in the second embodiment, because synchronization information S-n that includes error information E-n in addition to offset information O-n is generated, it is possible to align the positions on the time axis of the N items of video V-1 to V-N and N items of audio A-1 to A-N included in the content C and substantially to match the sampling frequencies of the N items of audio A-1 to A-N included in the content C. Therefore, it is possible to generate content C in which the differences in the sampling frequencies of the audio A-n of each recorded data D-n are reduced, by precisely synchronizing the N items of source material data T-1 to T-N.

Third Embodiment

The content C of the first embodiment includes an audio CA obtained by synthesizing the N items of audio A-1 to A-N and a video CV obtained by synthesizing the N items of video V-1 to V-N after the editing process has been executed. The content C of the third embodiment includes an audio CA corresponding to an audio A-n collected by a sound collection device 214 of one specific terminal device 14-$n$, and a video CV obtained by synthesizing N items of video V-1 to V-N after the editing process has been executed.

The recording device 21 of each terminal device 14-$n$ in the third embodiment generates recorded data D-n that include video V-n and audio A-n in the same manner as in the first embodiment. The information generation unit 251 of the third embodiment generates synchronization information S-n that contains offset information O-n, which indicates the position of the recorded data D-n on the time axis with respect to the reference data R, by comparing the audio A-n included in the recorded data D-n and audio that is represented by the reference data R, in the same manner as in the first embodiment.

Of the N terminal devices 14-1 to 14-N, one particular terminal device 14-$n$1 transmits source material data Tn-1, which include both video Vn-1 and audio An-1, together with synchronization information Sn-1, to the editing device 12. On the other hand, each of the remaining (N-1) terminal devices 14-$n$2 (n2≠n1) transmits source material data Tn-2, which include video Vn-2 but do not include audio An-2, to the editing device 12. That is, the transmission of the audio An-2 to the editing device 12 is omitted in each terminal device 14-$n$2.

The content generation unit 451 of the editing device 12 according to the third embodiment generates content C by using an editing process on the N items of source material data T-1 to T-N received by the communication device 41. The video CV of the content C is video obtained by mutually synchronizing and synthesizing N items of video V-1 to V-N respectively included in the source material data T-n transmitted from N terminal devices 14-1 to 14-N, in the same manner as in the first embodiment. On the other hand, the audio CA of the content C is the audio An-1 of the source material data Tn-1 transmitted from one terminal device 14-$n$1.

The same effects as those of the first embodiment are realized in the third embodiment. In addition, in the third embodiment, because the transmission of the audio An-2 from the terminal device 14-$n$2 to the editing device 12 is omitted, it is possible to reduce the amount of communication between the terminal device 14-$n$2 and the editing device 12, as well as to reduce the amount of data that is stored in the storage device 43 of the editing device 12. In addition, because a synthesis process when generating audio CA is not required in the content generation unit 451 of the editing device 12, it is possible to reduce the overall processing load on the editing device 12. Furthermore, because the audio CA included in the content C is the audio An-1of the source material data Tn-1 transmitted from one specific terminal device 14-*n*1, it is possible to reduce the amount of data that constitutes content C. It is also possible to use audio that is prestored in the storage device 43 of the editing device 12 as the audio CA that is included in content C. In this case, transmission of audio A-n to the editing device 12 is not required in any of the N terminal devices 14-1 to 14-N.

In the first embodiment and the second embodiment, recorded data D-n that include video V-n and audio A-n are transmitted from the terminal device 14-*n* to the editing device 12 as source material data T-n, and in the third embodiment, source material data Tn-2, in which audio An-2 is omitted from the recorded data Dn-2, are respectively transmitted from (N-1) terminal devices 14-*n*2 to the editing device 12. As can be understood form the foregoing description, the source material data T-n is expressed as data including video V-n that corresponds to the recorded data D-n, and the presence/absence of audio A-n in the source material data T-n is irrelevant.

Modified Examples

Each of the embodiments exemplified above may be variously modified. Specific modified embodiments are illustrated below. It is possible to appropriately combine two or more embodiments arbitrarily selected from the following examples.

(1) In each of the above-described embodiments, audio representing the reference data R is output from sound output devices installed at an event venue; however, devices for outputting audio representing the reference data R are not limited to the example described above. For example, it is also possible to output audio corresponding to the reference data R from a sound output device 294 of the terminal device 14-*n*. In this case, the audio A-na collected by the sound collection device 214 of a terminal device 14-*na* contains the reproduction sound (audio representing the reference data R) that is output by another terminal device 14-*nb* (where na≠nb). That is, common reference data R are utilized for generating both the reproduction sounds that are collected as recorded data D-na, and the synchronization information S-nb. Therefore, compared to each of the embodiments described above, in which recorded data D-n including audio A-n, in which the reproduction sounds that are output from a sound output device that is separate from the terminal device 14-*n* according to the reference data R are collected by a recording device 21, are recorded by the recording device 21, there is the advantage that it is not necessary to provide a separate device for outputting audio in accordance with the reference data R.

(2) In each of the above-described embodiments, audio signals representing audio corresponding to music (that is, sound within the audible frequency band) are set as the reference data R; however, the reference data R are not limited to audio signals representing audio corresponding to music. For example, it is also possible to use audio signals that represent sound signals outside of the audible frequency band as the reference data R. When setting audio signals that represent sound signals outside of the audible frequency band as the reference data R, sound signals outside of the audible frequency band is output according to the reference data R from sound output devices at the event venue, in the same manner as in the above-described embodiments. That is, the reference data R are transmitted by means of audio communication, in which sound waves as air-compression waves act as the transmission medium. For example, in the case of an event in which the output of sound within the audible frequency band or audio (music) is not assumed (for example, a speech or theatrical performance), it is difficult to output sound within the audible frequency band for the entire event. On the other hand, it is possible to output sound outside of the audible frequency band without affecting the event. According to a configuration in which audio representing sound outside of the audible frequency band is set as the reference data, it is possible to generate synchronization information S-n by outputting sound outside of the audible frequency band, even at an event in which the output of sound within the audible frequency band is not assumed. In addition to the audio communication exemplified above, short-range wireless communication, in which radio waves or electromagnetic waves are used as the transmission medium, may be used to transmit the reference data R.

In addition, a configuration in which moving image signals (video data) that represent video are set as the reference data R may also be suitably employed. For example, in the configuration described above, moving image signals containing a specific image at a point in time serving as an index on the time axis are set as the reference data R, and the specific image is caused to appear on a stage by means of an arbitrary method in parallel with, for example, a dance performance. Each terminal device 14-*n* records audio A-n and video V-n containing the specific image. The information generation unit 251 generates synchronization information S-n, which represents the relationship of the recorded data D-n with respect to the reference data R on a time axis, by comparing the reference data R stored in the storage device 23 with the video V-n of the recorded data D-n. Specifically, synchronization information S-n, indicating the time difference between the point in time of the reference data R at which the specific image is present, and the point in time of the video V-n at which the specific image is present, is generated. Known image analysis technology may be employed to compare the reference data R and the video V-n. As can be understood from the foregoing description, the reference data R may be comprehensively expressed as data that represent audio or video.

Because comparison between the reference data R and the audio A-n is not necessary in a configuration in which the reference data R is compared with the video V-n, it is possible to generate synchronization information S-n even when the recorded data D-n do not contain audio A-n. That is, it is possible to omit the recording of audio A-n. As can be understood form the description above, the recorded data D-n are expressed as data containing video V-n, and the presence/absence of audio A-n in the recorded data D-n is irrelevant.

(3) Prerecorded music, which is the audio representing the reference data R, is output from sound output devices installed at an event venue; however, the audio corresponding to the reference data R is not limited to music that has been prerecorded. For example, it is also possible to output, from sound output devices, music that is played live by a band simultaneously with the dance performance, as the audio representing the reference data R. That is, reference data R, in which music to be played is prerecorded, are utilized. As can be understood from the foregoing description, although cases in which audio represented by the reference data R itself is recorded by the terminal device 14 are preferable, cases in which audio that approximates, but that does not strictly match, the audio represented by the reference data R, is recorded by the terminal device 14, are also possible. That is, it is not necessarily the case that the audio A-n contained in the recorded data D-n contains the same acoustic components as the reference data R.

(4) In each of the embodiments described above, reference data R prepared in advance are distributed from the distribution device 16 to each terminal device 14-*n;* however, the distribution source of the reference data R is not limited to the example described above. For example, it is also possible to use audio An-1 collected by one specific terminal device 14-*n*1 as the reference data R. In this case, the terminal device 14-*n*1 transmits the audio An-1 to (N-1) terminal devices 14-*n*2 as the reference data R, at the point in time in which the recording of the recorded data Dn-1 is completed. Each terminal device 14-*n*2 generates synchronization information Sn-2 by comparing the reference data R received from the terminal device 14-*n*1 with the recorded data Dn-2 that have already been recorded. According to the configuration described above, because it is not necessary to prepare reference data R in advance, there is the advantage that a distribution device 16 is not required.

(5) In each of the embodiments described above, a server device was used as the editing device 12, but the editing device 12 is not limited to a server device. For example, it is possible to designate one specific terminal device 14-*n*1 from among N terminal devices 14-1 to 14-N as the editing device 12. In this case, the remaining (N-1) terminal devices 14-*n*2 transmit source material data Tn-2 and synchronization information Sn-2 to the terminal device 14-*n*1. According to the configuration described above, since an editing device 12 becomes unnecessary, it is possible to simplify the recorded data processing system 100. As can be understood from the foregoing description, the editing device 12 may include both a server device (including a server system constituting a plurality of servers, as well as a single server) and a terminal device 14-*n*.

(6) In the first embodiment and the third embodiment, synchronization information S-n including offset information O-n is generated, and in the second embodiment, synchronization information S-n including offset information O-n and error information E-n are generated; however, information included in the synchronization information S-n is not limited to the examples described above. The synchronization information S-n is comprehensively expressed as arbitrary information that indicates the relationship of the recorded data D-n with respect to the reference data R on the time axis.

(7) In each of the embodiments described above, a recorded data processing system 100 is utilized for recording a dance performance at an event venue; however, cases in which the recorded data processing system 100 is utilized is not limited to the example described above. For example, it may also be used at performances such as a conference, or in ceremonies such as weddings or funerals.

(8) The terminal device 14-*n* exemplified above is realized by means of cooperation between the electronic controller 25 and a program, as described above. In addition, the editing device 12 is realized by means of cooperation between the electronic controller 45 and a program, as described above. The program can be provided in a form stored on a storage medium that can be read by a computer and installed in a computer. The storage medium is, for example, a non-transitory storage medium, a good example being an optical storage medium (optical disc) such as a CD-ROM, but may include storage media of any known format, such as a semiconductor storage medium or a magnetic storage medium. Non-transitory storage media include any storage media that exclude transitory propagating signals, and does not exclude volatile storage media. In addition, it is also possible to provide a program to a computer in the form of distribution via a communication network. Additionally, the program exemplified above may be installed in a computer by being provided in the form of distribution via a communication network. In addition, it may also be specified as an operation method for the terminal device 14-*n* according to each embodiment described above (recorded data processing method) or as an operation method for the editing device 12.

(9) For example, the following configurations may be understood from the embodiments exemplified above.

In the recorded data processing method according to a one aspect, a terminal device, which is capable of communicating with an editing device that generates, from a plurality of source material data, content including a plurality of videos which are mutually synchronized, compares recorded data that include video that is recorded by a recording device and reference data that act as a reference for said recorded data on a time axis and that represent audio or video, to generate synchronization information that represents the relationship of the recorded data with respect to the reference data on a time axis, and transmits source material data that include video that corresponds to the recorded data and the generated synchronization information to the editing device. In the method described above, synchronization information is generated in a terminal device, which is the transmission source of source material data to the editing device. Accordingly, compared with a method in which the temporal relationship between each item of recorded data is analyzed after aggregating a plurality of items of recorded data in the editing device to mutually synchronize videos, it becomes possible to reduce the processing load on the editing device (and, by extension, the time necessary for generating the content), even if, for example, the total amount of the recorded data is extremely large.

In a recorded data processing method according to another aspect, the synchronization information includes offset information that indicates the position of the recorded data with respect to preference data on the time axis. In the method described above, synchronization information that includes offset information is generated. Thus, by utilizing the offset information, it is possible to align the positions on the time axis of a plurality of videos included in the content.

In a recorded data processing method according to another aspect, the reference data are audio signals that represent audio, the recorded data include audio that is recorded in parallel with video, and synchronization information, which indicates the relationship between the audio represented by the reference data and the audio included in the recorded data on the time axis, is generated. In the method described above, synchronization information, which indicates the relationship of the recorded data with respect to the reference data including audio signals on the time axis, is generated.

In a recorded data processing method according to another aspect, the synchronization information includes error information that represents errors in the sampling frequencies between the audio represented by the recorded data and the audio represented by the reference data. In the method described above, synchronization information that includes error information is generated. Thus, compared with a method that generates synchronization information that does not include error information, it is possible to reduce differences in the sampling frequencies of the audio of each recorded data and to accurately synchronize a plurality of items of source material data.

In a recorded data processing method according to another aspect, the recorded data include audio obtained by collecting reproduction sounds that are output from a sound output device of a terminal device according to the reference data by using a recording device. In the method described above, the recording device records recorded data including audio obtained by using a recording device to collect reproduction sounds that are output from a sound output device of a terminal device, in accordance with the reference data. That is, common reference data are utilized for generating both the reproduction sounds that are collected as recorded data as well as the synchronization information. Thus, compared with a method in which recorded data including audio, in which the reproduction sounds that are output from a sound output device that is separate irons the terminal device according to the reference data are collected by means of a recording device, are recorded by the recording device, there is the advantage that it is not necessary to provide a separate device for outputting audio in accordance with the reference data.

In a recorded data processing method according to another aspect, the audio signals represent sound outside of the audible frequency band. For example, in the case of an event in which the output of sound within the audible frequency band or audio (music) is not assumed (for example, a speech or a theatrical performance), it is difficult to output sound within, the audible frequency band for the entire event. On the other hand, it is possible to output sound outside of the audible frequency band without affecting the event. According to the method described above, in which audio representing sound outside of the audible frequency band are set as the reference data, it is possible to generate synchronization information by outputting sound outside of the audible frequency band, even at an event in which the output of sound within the audible frequency band is not assumed.

A terminal device according to one aspect is capable of communicating with an editing device that generates from a plurality of source material data that are mutually synchronized, content including a plurality of videos and comprises an information generation unit that compares recorded data that include video that is recorded by a recording device and reference data that act as a reference for the recorded data on a time axis, to generate synchronization information that represents the relationship of the recorded data with respect to the reference data on a time axis, and a communication device that transmits to the editing device source material data that include video that corresponds to the recorded data and the synchronization information generated by the information generation unit. With the configuration described above, synchronization information is generated in a terminal device, which is the transmission source of source material data to the editing device. Thus, compared with a configuration in which the temporal relationship between each item of recorded data is analyzed after aggregation of a plurality of items of recorded data in the editing device to mutually synchronize videos, it becomes possible to reduce the processing load on the editing device (and, by extension, the time necessary for generating the content), even if, for example, the total amount of the recorded data is extremely large.

An editing device according to one aspect comprises a communication device that respectively receives, from a plurality of terminal devices, synchronization information that represents the relationship of recorded data with respect to reference data, which act as a reference for recorded data including video recorded by a recording device on a time axis, and which represent audio or video, on a time axis, and source material data, which include video that corresponds to the recorded data, and a content generation unit that generates from a plurality of source material data and a plurality of synchronization information, content including a plurality of mutually synchronized videos. With the configuration described above, content that includes a plurality of videos that are mutually synchronized with each other is generated by utilizing synchronization information that is transmitted from a plurality of terminal devices. Thus, compared with a configuration in which content, which includes a plurality of videos that are mutually synchronized, is generated by analyzing the temporal relationship between each item of recorded data after aggregation of a plurality of items of recorded data in the editing device, it becomes possible to reduce the processing load on the editing device (and, by extension, the time necessary for generating the content), even if, for example, the total amount of the recorded data is extremely large.

In an editing device according to another aspect, one item of source material data from among a plurality of source material data received by the communication device contains audio, and the content generation unit generates content that includes video included in the plurality of source material data respectively received from a plurality of terminal devices and audio included in one item of source material data. With the configuration described above, only one terminal device from among a plurality of terminal devices transmits source material data that include audio. In other words, the transmission of audio from the other terminal devices to the editing device is omitted. Thus, it is possible to reduce the amount of communication between the terminal device and the editing device, as well as to reduce the amount of data that are stored in the storage device of the editing device.

What is claims:
1. A recorded data processing method comprising:
generating synchronization information indicating a relationship of recorded data with respect to reference data on a time axis by comparing the recorded data including video recorded by a recording device and the reference data that act as a reference for the recorded data on a time axis and that, represent audio or video; and
transmitting from a terminal source material data that include video that corresponds to the recorded data and the synchronization information that was generated to an editing device that generates content including a plurality of mutually synchronized videos from a plurality of the source material data,
the reference data further including audio signals that represent audio,
the recorded data including audio that is recorded in parallel with the video,
in the generating of the synchronization information, the synchronization information which indicates a relationship between the audio represented by the reference data and the audio included in the recorded data on the time axis being generated, the synchronization information including error information that represents errors in sampling frequencies between the audio represented by the recorded data and the audio represented by the reference data.

2. The recorded data processing method according to claim 1, wherein
the synchronization information includes offset information that indicates the position of the recorded data with respect to the reference data on the time axis.

3. The recorded data processing method according to claim 1, wherein
the recorded data include audio obtained by collecting reproduction sounds that are output from a sound output device of the terminal device in accordance with the reference data by using the recording device.

4. The recorded data processing method according to claim 1, wherein
the audio signals represent audio outside of an audible frequency band.

5. A terminal device comprising:
an electronic controller having an information generation unit configured to generate synchronization information indicating a relationship of recorded data with respect to reference data on a time axis by comparing the recorded data including video recorded by a recording device and the reference data that act as a reference for the recorded data on the time axis and that represent audio or video; and
a communication device configured to transmits source material data that include video that corresponds to the recorded data and the synchronization information that was generated to an editing device that generates content including a plurality of mutually synchronized videos from a plurality of the source material data,
the reference data further including audio signals that represent audio,
the recorded data including audio that is recorded in parallel with the video,
the information generation unit being configured to generate the synchronization information, which indicates a relationship between the audio represented by the reference data and the audio included in the recorded data on the time axis, the synchronization information including error information that represents errors in sampling frequencies between the audio represented by the recorded data and the audio represented by the reference data.

* * * * *